United States Patent [19]

Michaud et al.

[11] Patent Number: 5,429,581
[45] Date of Patent: Jul. 4, 1995

[54] WEAR-RESISTANT TILE SURFACING FOR A CENTRIFUGE CONVEYOR

[75] Inventors: Richard R. Michaud, Waterbury; Chie-Ying Lee, Milford, both of Conn.

[73] Assignee: Dorr-Oliver Incorporated, Milford, Conn.

[21] Appl. No.: 321,787

[22] Filed: Oct. 12, 1994

Related U.S. Application Data

[63] Continuation-in-part of Ser. No. 206,760, Mar. 7, 1994, abandoned.

[51] Int. Cl.[6] .......................... B04B 1/20; B65G 33/26
[52] U.S. Cl. ...................................... 494/54; 198/677; 403/381
[58] Field of Search ...................................... 494/50–54; 210/380.1, 380.3; 366/64, 318, 319, 324; 198/676, 677; 403/381

[56] References Cited

U.S. PATENT DOCUMENTS

| | | |
|---|---|---|
| 1,142,916 | 6/1915 | Scott . |
| 2,600,372 | 6/1952 | Milliken . |
| 3,469,824 | 9/1969 | Futty et al. . |
| 3,485,341 | 12/1969 | Lutz ................................. 198/213 |
| 3,762,537 | 10/1973 | Lutz ................................. 198/213 |
| 3,764,062 | 10/1973 | Brautigam . |
| 3,937,317 | 2/1976 | Fleury, Jr. ....................... 198/213 |
| 3,977,515 | 8/1976 | Lewoczko ....................... 198/213 |
| 4,003,115 | 1/1977 | Fisher ............................... 29/156.8 |
| 4,006,855 | 2/1977 | Merzenich . |
| 4,242,002 | 12/1980 | Kawabata ........................ 366/343 |
| 4,298,161 | 11/1981 | Ephithite . |
| 4,328,925 | 5/1982 | Shapiro . |
| 4,416,656 | 11/1983 | Shapiro ............................. 494/53 |
| 4,419,090 | 12/1983 | Chulada et al. ................. 494/53 |
| 4,449,967 | 5/1984 | Caldwell .......................... 494/54 |
| 4,519,496 | 5/1985 | Ludvigsen ....................... 198/676 |
| 5,279,407 | 1/1994 | Shobak ............................. 198/677 |

FOREIGN PATENT DOCUMENTS

| | | | |
|---|---|---|---|
| 3140364 | 4/1983 | Germany .............................. 494/53 |
| 3601949 | 7/1987 | Germany .............................. 494/53 |
| 55-89128 | 7/1980 | Japan ................................... 198/676 |
| 61-50654 | 11/1986 | Japan ................................... 494/53 |
| 2126491 | 3/1984 | United Kingdom ............... 366/64 |
| 2273253 | 6/1994 | United Kingdom ............... 494/53 |
| 737018 | 5/1980 | U.S.S.R. ............................... 494/54 |

*Primary Examiner*—Charles E. Cooley
*Attorney, Agent, or Firm*—DeLio & Peterson

[57] ABSTRACT

A hard surfaced screw conveyor comprising a helical metal blade mounted for rotation about a longitudinal axis of the helix and radially extending to an end surface, the blade defining at least one female formation therein having a substantially dovetail shape and a longitudinal axis substantially perpendicular to the blade, and at least one wear-resistant member secured to the blade and having a portion radially extending beyond the end surface. The wear-resistant member defines a male formation that has a substantially dovetail shape and which is disposed within the female formation. The male and female formations may also be triangular, square, circular, or rectangular in shape.

20 Claims, 5 Drawing Sheets

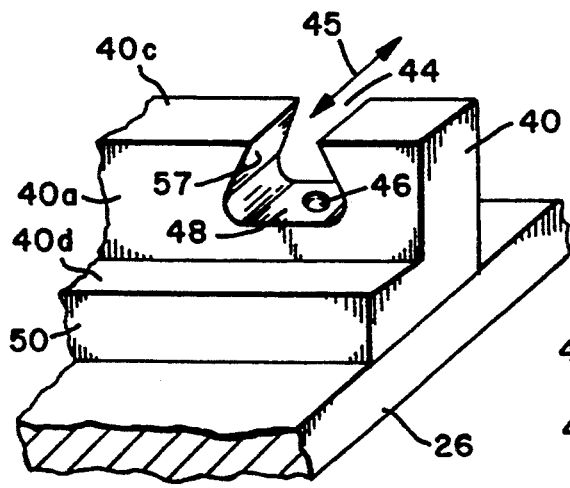
FIG. 3
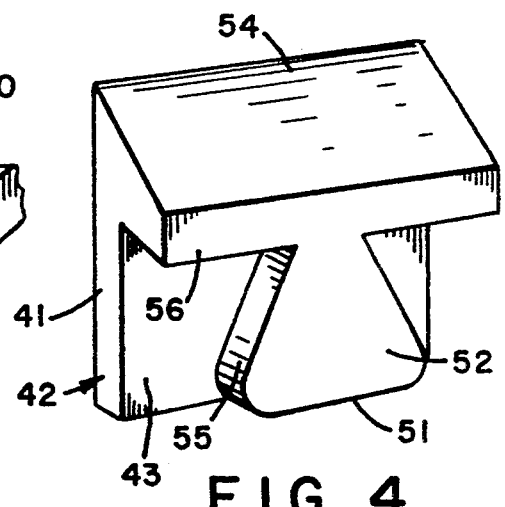
FIG. 4
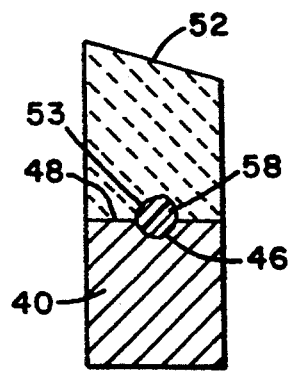
FIG. 5
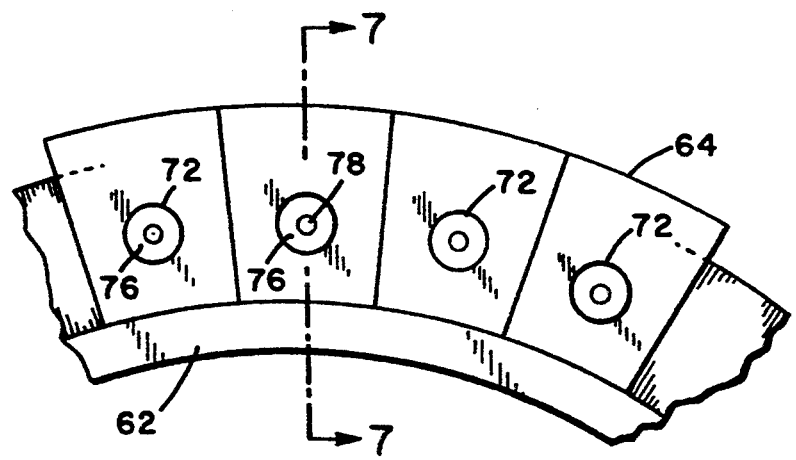
FIG. 6
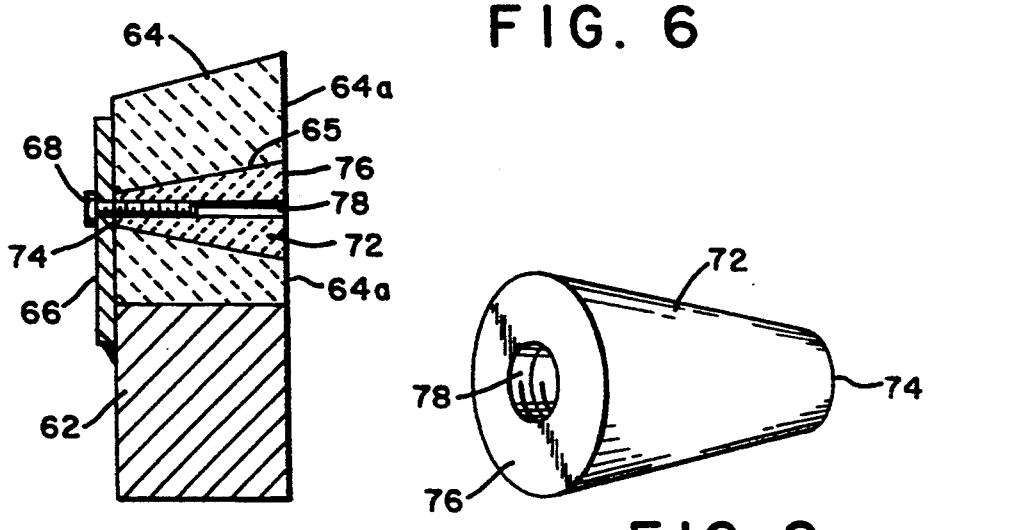
FIG. 7
FIG. 8

WEAR-RESISTANT TILE SURFACING FOR A CENTRIFUGE CONVEYOR

This is a continuation in part of U.S. Ser. No. 08/206,760, filed Mar. 7, 1994, now abandoned.

BACKGROUND OF THE INVENTION

1. Field of the Invention

The present invention relates to centrifuges and more particularly, to an improved hard surfaced centrifuge screw conveyor.

2. Description of Related Art

One significant problem with separating centrifuges is the wear of the helical conveyor blades by abrasive solids. Although the conveyor blades are typically fabricated from hard-wear steel alloys, abrasive solids can cause such wear in the critical solids contacting area so as to alter blade surface characteristics and clearance from the surrounding wall of the centrifuge bowl.

Wear-resistant members which are attached to the conveyor blades are utilized to prevent wear of the helical conveyor blades. However, it has been found that conventional wear-resistant members are difficult to install and remove. One attempt at solving the aforementioned problem of screw conveyor blade wear is disclosed is U.S. Pat. No. 4,328,925 entitled "Hard Surfacing for a Centrifuge Conveyor" issued May 11, 1982 to Shapiro ("'925 patent"). The '925 patent discloses one embodiment which utilizes a dovetail groove formed in a backing tile, which is fixed to the conveyor distal surface, and a complimentarily configured dovetail portion of an abrasion-resistant member slidably engaged therein. The axes of the dovetail groove and complimentary dovetail portion are parallel to the helical blade and therefore, follows the helix of the conveyor. It has been found that such a configuration presents great difficulty in removing and installing the abrasion-resistant members due to the difficulty for technicians to correctly position their tools when attempting to replace the abrasion resistant members. Furthermore, the aforementioned dovetail grooves disclosed in the '925 patent cannot be formed in short conveyor flights such as in decanter-type centrifuges. Additionally, it has been found that since the grooves follow the helix and thus, generally follow the direction of rotation of the conveyor, the tiles mounted to the conveyor are prone to moving in a direction parallel to the conveyor blade during rotation of the conveyor. Such tiles have also become unattached from the blade during rotation of the conveyor. In another embodiment, the '925 patent discloses an abrasion-resistant surface assembly comprising a backing tile, which is welded to the flight of the screw conveyor, and an abrasion-resistant member which is secured to the backing tile via a wedge plate acting in conjunction with a screw. However, such a configuration cannot be utilized with conveyor flights of minimum height.

Another attempt to solve the aforementioned problems is to braze tungsten carbide tiles to the conveyor blade or flight. However, it has been found that such a configuration results in cracked and damaged tungsten tiles that could disintegrate during operation of the centrifuge. A further attempt to solve the aforementioned problems is to epoxy wear-resistant or abrasion resistant tiles to the conveyor flights. However, it has been found that the epoxy bond cannot withstand the centrifugal force produced by the rotating conveyor.

It has also been found that conventional hard or wear-resistant surfacing cannot withstand high magnitude centrifugal forces produced by conveyors that operate at high r.p.m. (revolutions per minute), i.e., 6,000 r.p.m.

Bearing in mind the problems and deficiencies of the prior art, it is therefore an object of the present invention to provide a new and improved hard surfacing for a centrifuge screw conveyor that can be utilized in conjunction with conveyor flights of minimum height.

It is another object of the present invention to provide a new and improved hard surfaced centrifuge screw conveyor having wear-resistant members mounted on the conveyor and which can be easily removed and installed without incurring unnecessary expense and centrifuge down time.

It is a further object of the present invention to provide a new and improved hard surfacing for a centrifuge screw conveyor that can be manufactured at a reasonable cost.

It is another object of the present invention to provide a new and improved hard surfacing that can be applied to existing centrifuge screw conveyors.

It is a further object of the present invention to provide a new and improved hard surfaced centrifuge screw conveyor having wear-resistant members mounted on the conveyor which remain secure during operation of the centrifuge and can withstand extreme magnitudes of centrifugal force.

It is yet another object of the present invention to provide a new and improved method for applying hard surfacing to existing centrifuge screw conveyors at a reasonable cost.

SUMMARY OF THE INVENTION

The above and other objects, which will be apparent to those skilled in the art, are achieved in the present invention which is directed to a hard surfaced screw conveyor for centrifuges comprising a helical metal blade mounted for rotation about the longitudinal axis of the helix wherein the blade radially extends to an end surface, at least one wear-resistant member on the blade wherein the member has a portion radially extending beyond the end surface, and means securing the wear-resistant member to the blade. The securing means comprises male and female formations on the wear-resistant member and the blade, respectively. The female formation has a longitudinal axis substantially perpendicular to the blade. The male and female formations are configured in a manner so as to preclude the wear-resistant member from moving in a direction that is radial to the conveyor rotational axis or parallel to the blade.

In another aspect, the present invention is directed to a method of applying wear-resistant surfacing to a centrifuge conveyor comprising the steps of:

(a) providing a conveyor having a helical metal blade mounted for rotation about the longitudinal axis of the helix wherein the blade radially extends to an end surface;

(b) forming a female formation in the blade in a manner such that the longitudinal axis of the female formation is substantially perpendicular to the blade;

(c) providing at least one wear-resistant member having a male formation projecting therefrom which is complimentary in shape to the female formation; and (d) removably attaching the wear-resistant member to the blade in such a manner that the male formation is disposed within the female formation.

BRIEF DESCRIPTION OF THE DRAWINGS

FIG. 3 is a partial perspective view of a conveyor flight in accordance with the present invention.

FIG. 4 is a perspective view of a wear-resistant tile in accordance with the present invention.

FIG. 5 is an elevational view in cross-section taken along line 5—5 of FIG. 2.

FIG. 6 is a view similar to FIG. 2 showing a conveyor flight embodying an alternate embodiment of the present invention.

FIG. 7 is an elevational view in cross-section taken along line 7—7 of FIG. 6.

FIG. 8 is a perspective view of the conically shaped member depicted in FIG. 7.

DESCRIPTION OF THE PREFERRED EMBODIMENTS

Figure 1:
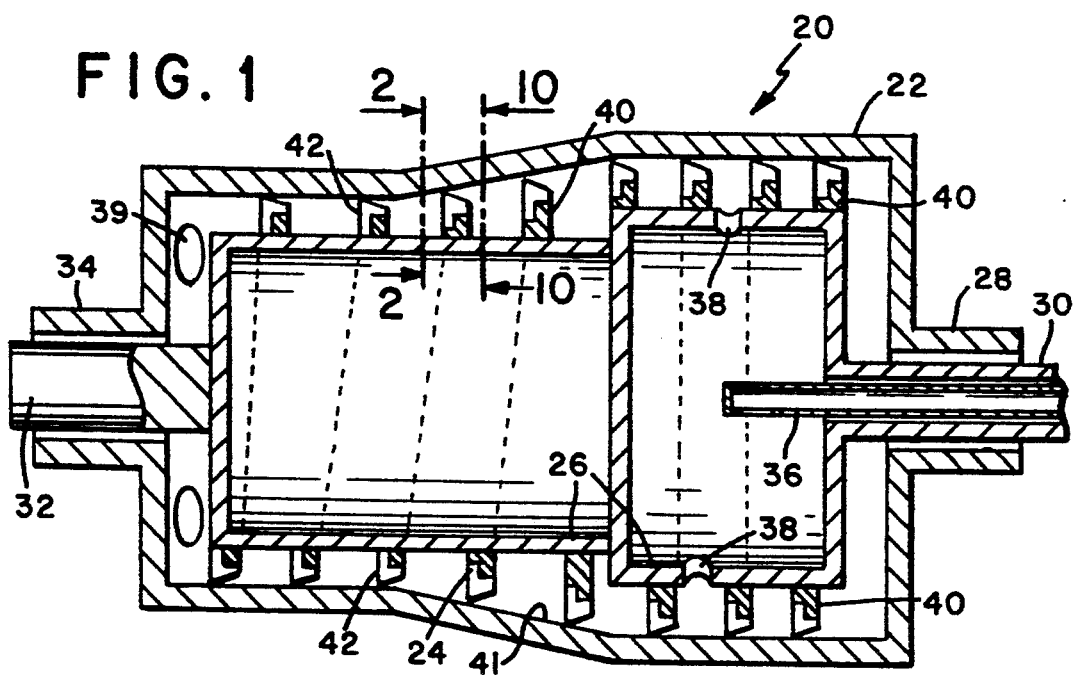
FIG. 1 is a partial longitudinal cross-sectional view, somewhat simplified, of a centrifuge and conveyor assembly embodying the invention.
Figure 2:
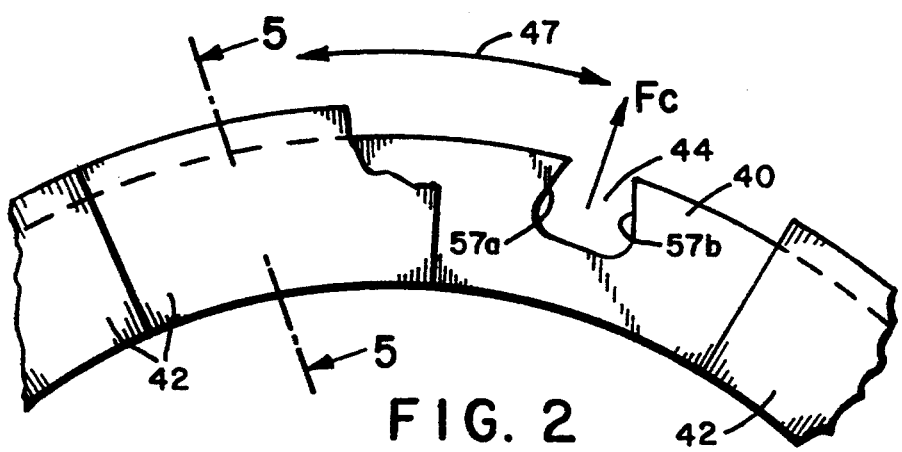
FIG. 2 is an enlarged partial view taken along line 2—2 of FIG. 1.

Centrifuges in which conveyors according to the invention are used may be of various types including solid bowl and perforate bowl continuous centrifuges, and combinations of the two. In FIG. 1, the centrifuge 20 chosen for illustration has a solid bowl 22 surrounding a screw conveyor 24 which is mounted on hollow hub 26. The bowl is rotated by means of a hollow shaft 28 at the cylindrical end of bowl 22. The drive connections (not shown) include support bearings, a drive sheath and belt connections to a motor (all of which are not shown). Conveyor hub 26 has at one a hollow shaft 30 extending into shaft 28 and is received in bearings (not shown), and at the other end has a shaft 32 extending through hollow shaft 34 on the bowl to differential drive connections (not shown) by which it is rotated in the same direction as the bowl at a differential speed.

Figure 16:
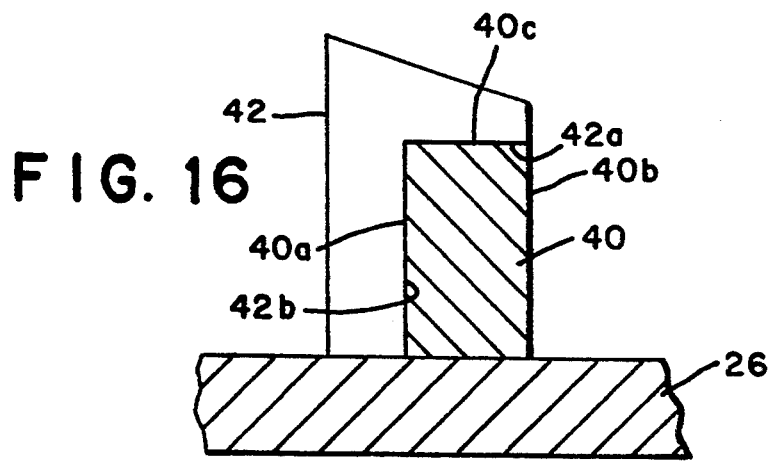
FIG. 16 is an enlarged elevational view of a portion of the conveyor flight depicted in FIG. 1.

An input feed mixture or slurry enters hub 26 through feed pipe 36 extending through shaft 30. Feedpipe 36 discharges the feed into a feed compartment in hub 26 which in turn discharges it into bowl 22 through ports 38. As bowl 22 and conveyor 26 rotate, centrifugal forces cause the heavier, more dense solids to move radially outwardly with respect to the conveyor, to positions proximate the bowl interior surface 41. Conveyor 24, which rotates at a slightly different speed than bowl 22, moves the separated solids towards solids discharge port 39. Separated liquid moves to a liquid discharge port, not shown. Conveyor 24 is made up of a helically pitched metal stub blade or flight 40 welded to conveyor hub 26. Referring to FIG. 16, flight 40 has radially disposed side surfaces 40a, 40b extending to end surface 40c. Flights of greater height also have step or lip portion 40d upon which is positioned the wear-resistant member (see FIG. 17).

Figure 17:
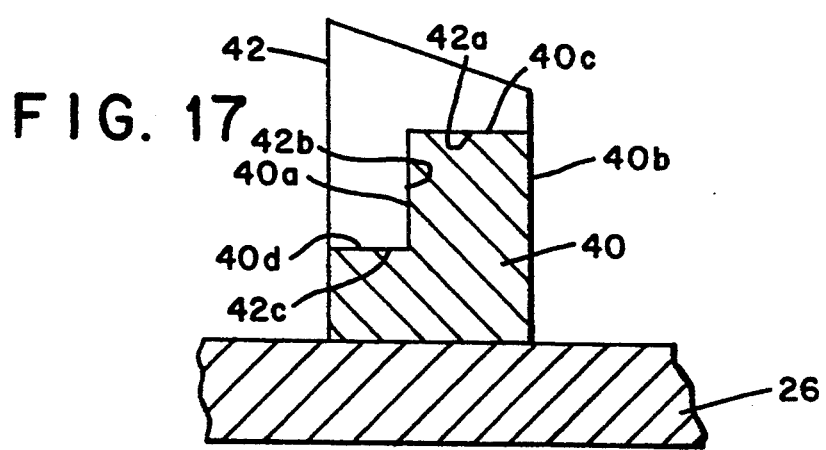
FIG. 17 is an enlarged elevational view of a further portion of the conveyor flight depicted in FIG. 1.
Figure 19A:
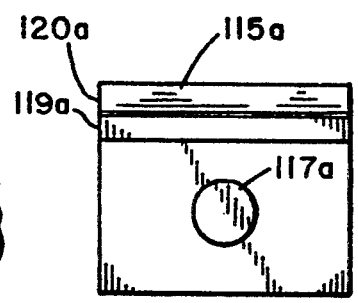
Figure 19B:
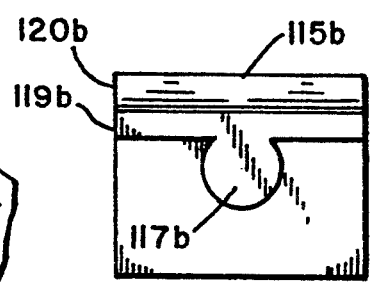

Referring to FIGS. 2–5 and 16, a plurality of abutting wear-resistant tiles 42 are mounted to helical flight or blade 40 in such a manner that tile 42 overlays surface 40a and end surface 40c. Tile 42 has an "L" shape and is formed by an injection molding process. Referring to FIG. 4, tile 42 comprises top portion 54, overhanging lip portion 56, upstanding wall portion 41 and substantially dovetail shaped portion or male formation 52. Top portion 54 is angulated downward with respect to wall portion 41. Portion 52 of tile 42 is received by complimentarily configured substantially dovetail shaped cut-out or notch (or female formation) 44 formed in blade or flight 40. Lip 50 of flight 40 extends outwardly from radially extending surface 40a. The longitudinal axis, designated by arrow 45, of cutout or female formation 44 is substantially perpendicular to the flight or blade 40. Dovetail shaped portion 52 of tile 42 can only be inserted or removed by maneuvering tile 42 in the direction designated by arrow 45. Referring to FIGS. 16 and 17, tile 42 is mounted to flight 40 in such a manner that planar surface 43 of tile 42 contacts surface 40a of flight 40. Such a configuration prevents tile 42 from moving in a direction that is radial to the conveyor rotational axis during rotation of the screw conveyor. The screw conveyor rotates in the direction indicated by arrow 47. As the conveyor 24 rotates, a centrifugal force, indicated by the arrow designated as Fc in FIG. 2, acts to force the tile upward in a manner such that the tile contacts surfaces or inner walls 57a and 57b of cutout or notch 44. Surface 57a and 57b lock the tile into cutout or opening 44. Dovetail portion 52, and hence tile 42, are precluded from moving in a direction that is radial to the conveyor rotational axis or parallel to blade or flight 40. Although the aforementioned male and female formations may be configured in accordance with geometric shapes other than dovetail, as will be described below, it is preferred that the male and female formations are of a substantial dovetail shape. The dovetail shape facilitates mounting the tile to flights or blades on existing conveyors and provides a means of locking the tile in place when it is subjected to a centrifugal force (which is created by rotation of the conveyor). Typically, the shape of a conveyor is substantially conical which results in a constantly changing conveyor diameter. Furthermore, the space between conveyor flights is minimal and typically cannot accommodate tools having a tool axis perpendicular to the flight. Thus, any tooling used to modify the conveyor must be indexed along the flight at different angular positions and positioned between conveyor blades or flights. Utilizing substantially dovetail shaped male and female formations on existing conveyors facilitates attainment of the aforementioned object: to provide a new and improved hard surfacing that can be applied to existing conveyors at reasonable costs.

Referring to FIGS. 3 and 4, bottom surface 48 of notch 44 has recess or dimple 46 formed therein which receives a portion of spherically shaped elastomer member 58 (see FIG. 5). Bottom end 51 of dovetail portion 52 has a complimentarily matching recess 53 therein. When portion 52 is inserted into cutout 44, recess 46 is aligned with recess 53 so as to define a chamber. Spherical member 58 is contained within the chamber and has a degree of resiliency which produces an upward force upon tile 42 thereby creating frictional contact between the edges 55 of dovetail portion 52 and inner walls 57 of cutout 44. Such a configuration prevents dovetail shaped portion 52 from becoming dislodged from cutout 44 when the screw conveyor is at a standstill i.e., when there is no rotation of conveyor 24 and hence, no centrifugal force being exerted on tile 42. Hence, tile 42 is also constrained from moving in a direction that is perpendicular to flight 40. Member 58 can be fabricated from rubber, plastic or any other material exhibiting resilient or elastic properties. In a preferred embodiment, member 58 is fabricated from rubber and has a circular or ball shape. The simple construction of tile 42 and groove 44 facilitate replacement of tile 42 when necessary. The complimentary dovetail shaped female and male formations 44 and 52, respectively, provide a hard surfaced screw conveyor wherein the wear-resistant members 42 can withstand high magnitude centrifugal forces. An epoxy adhesive can optionally be applied to the inner surface or walls 57 of cutout 44 prior to inserting therein dovetail shaped portion 52. The preferred adhesive is a heat and chemical resistant epoxy AV-138/HV-998 manufactured by Ciba Geigy. This adhesive can be utilized at room temperature conditions and does not require a "clean room" environment.

Figure 9:
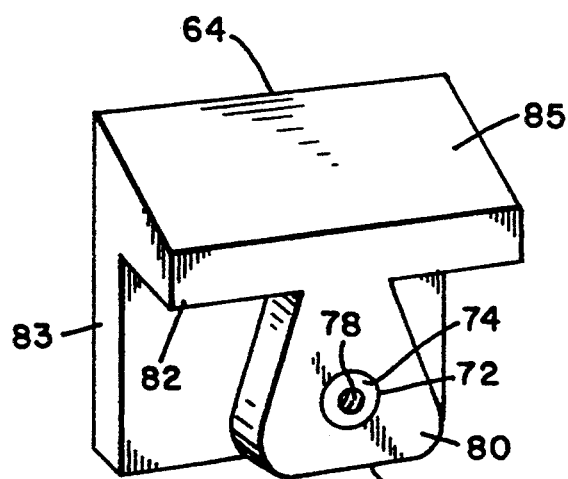
FIG. 9 is a perspective view of the wear-resistant tile depicted in FIG. 7.

Referring to FIGS. 6-9, an alternate embodiment of the present invention is shown. Referring to FIG. 6 in particular, a plurality of abutting wear-resistant tiles 64 are mounted to helical flight or blade 62. Referring to FIG. 7, tile 64 is injection molded and comprises abrasion-resistant or wear-resistant portion 64a having conically shaped bore 65 formed therethrough. Referring to FIG. 9, tile 64 is similar in construction to tile 42. Tile 64 is "L" shaped and comprises top portion 85, overhanging lip portion 82, upstanding wall portion 83 and dovetail shaped portion 80. Top portion 85 is angulated downward with respect to wall portion 83. Conical shaped portion or plug 72 is injection molded separately from tile 64. Plug 72 is injection molded in such a manner so as to form threaded bore 78 therethrough which extends between ends 74 and 76. Tile 64 is attached to flight 62 by inserting the dovetail shaped portion 80 of tile 64 into a mating or complimentary dovetail shaped cutout or female formation (similar to FIG. 3) formed in conveyor flight 62. Plug 72 is then inserted into conically shaped bore 65 by inserting the appropriate tool within bore 78 and pulling plug 72 into conically shaped bore 65. Tile 64 is then secured to flight 62 by high strength steel, cadmium plated screw 68 which is inserted into opening 75 of plug 72 and is threadedly engaged with bore 78. Screw 68 secures tile 64 to stainless steel strip 66 which is tack welded to flight 62. In a preferred embodiment, portion 64a is comprised of silicon carbide. Silicon carbide is very hard and brittle and thus, is difficult to drill through or machine. In order to achieve a wear-resistant or abrasion resistant tile which can be easily removed or secured to a conveyor flight, inner portion or plug 72 has sufficient elasticity so as to allow threads to be formed within bore 78, adjacent end 74, so as to accept stainless steel retaining screw 68 (see FIG. 7). In a preferred embodiment, plug 72 is comprised of zirconia. Prior to inserting portion 80 into the dovetail shaped cutout, the inner surfaces of the groove may be optionally coated with the aforementioned epoxy. The aforementioned epoxy adhesive may also be used with the embodiments discussed below. Prior to attaching the tile to the flight, the adhesive is applied to the inner surfaces or walls of the dovetail shaped female formation. When, the tile is drawn up tight with the retaining screw, the excess adhesive will be squeezed out. Adhesive will also be applied to the threaded bore of the tile thereby locking the retaining screw into the tile. When removing the tile from the blade, solvents well known in the field may be used to dissolve the epoxy bond to facilitate removal of the tile from the flight.

Figure 11:
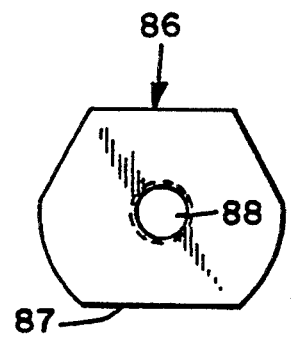
FIG. 11 is a front elevational view of the backing plate depicted in FIG. 10.
Figure 12:
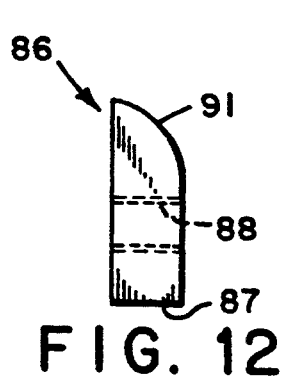
FIG. 12 is a side elevational view of the backing plate depicted in FIG. 11.
Figure 13:
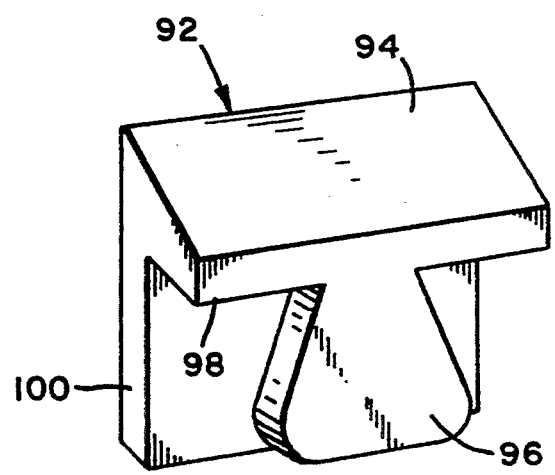
FIG. 13 is a perspective view of the wear-resistant tile depicted in FIG. 10.
Figure 14:
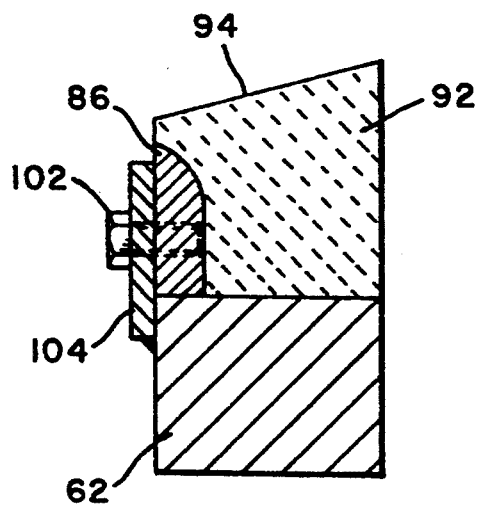
FIG. 14 is an elevational view in cross-section taken along line 14—14 of FIG. 10.

FIGS. 10-14 show a further embodiment of the present invention. Referring to FIG. 13, tile 92 is similar in construction to tile 42 depicted in FIG. 4. Tile 92 has an "L" shape and is comprised of top portion 94, overhanging lip portion 98, upstanding wall portion 100 and dovetail shaped portion or male formation 96. Top portion 94 is angulated downward with respect to wall portion 100. In a preferred embodiment, tile 92 is formed by an injection molding process. Similar to the aforementioned embodiments, dovetail shaped portion 96 is inserted into a complimentary or mating dovetailed shaped cutout or female formation, similar to FIG. 3, which is formed in the flights of screw conveyor. Dovetail shaped backing plate 86, backing strip 104 and retaining screw 102 cooperate to secure tile 92 to flight 62. Referring to FIGS. 11, 12 and 14, backing plate 86 has a dovetail shape and threaded bore 88 therethrough. Curved portion 91 of plate 86 is positioned beneath overhanging lip portion 98 of tile 92. Preferably, plate 86 is brazed to tile 92 prior to inserting portion 96 into the dovetail shaped cutout in flight 62 (see FIG. 14). Stainless steel backing strip 104 is tack welded to flight 62 and has an opening therein for receiving stainless steel screw 102. Screw 102 is threadedly engaged with bore 88 of plate 86 so as to secure tile 92 to flight 62. In a preferred embodiment, tile 92 is comprised of tungsten carbide. As with silicon carbide, tungsten carbide is very hard and is difficult to drill through. However, the utilization of backing plate 86 avoids the need and expense of having to drill or machine tile 92 so as to form a threaded bore.

Figure 15:
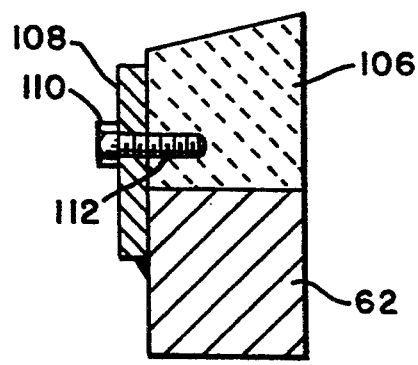
FIG. 15 is an elevational view in cross-section, similar to that of FIG. 14, showing an alternate embodiment of the present invention.
Figure 10:
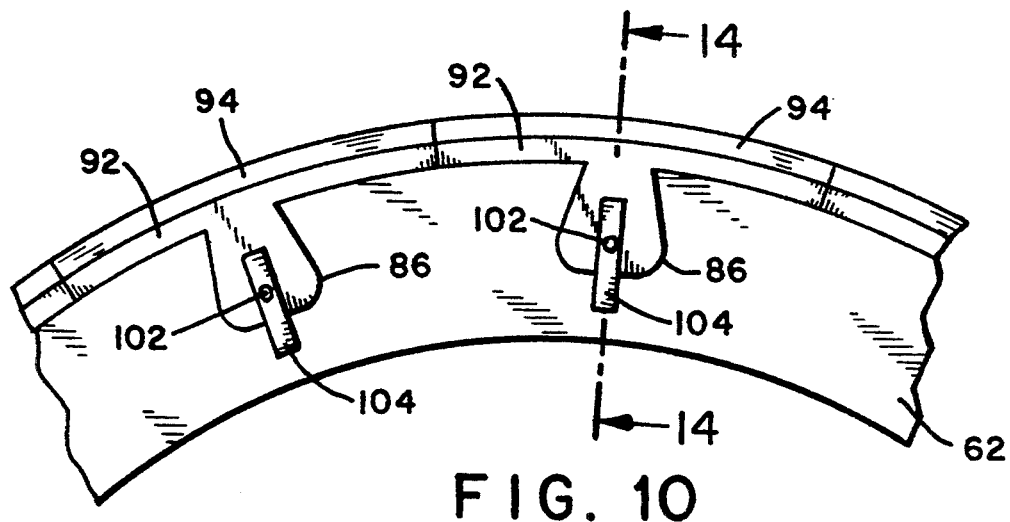
FIG. 10 is a partial elevational view taken along line 10—10 of FIG. 1 showing an alternate embodiment of the present invention.

FIG. 15 shows a further embodiment of the present invention. Tile 106 is similar in construction to tile 92 shown in FIG. 13 and is also injection molded. However, tile 106 is comprised of a ceramic material with a modulus of elasticity and thermal expansion coefficient equivalent to steel. The elasticity of the material allows the formation of threaded bore 112 which receives screw 110. Bore 112 is formed in tile 106 after the completion of the injection molding process. This embodiment also utilizes a dovetail male formation formed on tile 106 and a complimentary or mating female formation formed in the conveyor flight. Stainless steel strip 108 is tack welded to flight 62 and has an opening therein for receiving screw 110. Screw 110 is threadedly engaged with bore 112 so as to secure tile 106 to flight 62. In a preferred embodiment, tile 106 is fabricated from magnesia stabilized zirconia. This type of zirconia is about 30% (percent) lighter than Ferralium 255 and is chemically inert except for hydrofluoric acid and hot concentrated sulfuric acid. Furthermore, the properties of this type of zirconia is suitable for injection molding processes.

Figure 18E:
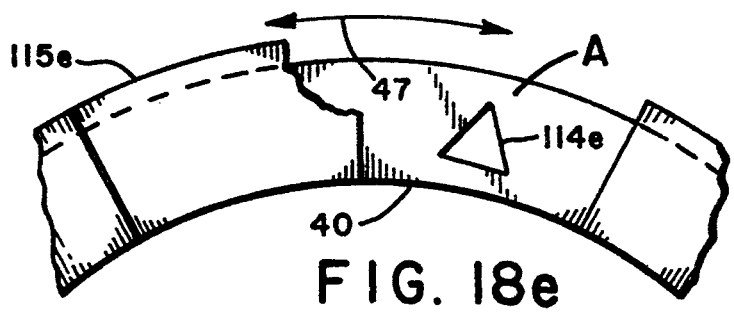
FIG. 18a–e show enlarged partial views, similar to FIG. 2, of alternate female formations formed in the conveyor flight.
Figure 19E:
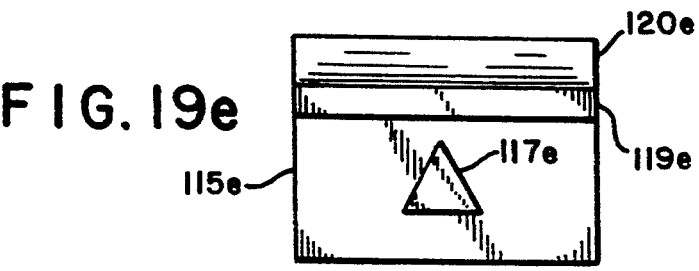
FIGS. 19a–e show front elevational views of wear-resistant members that are utilized with corresponding female formations shown in FIGS. 18a–e.
Figure 18A:
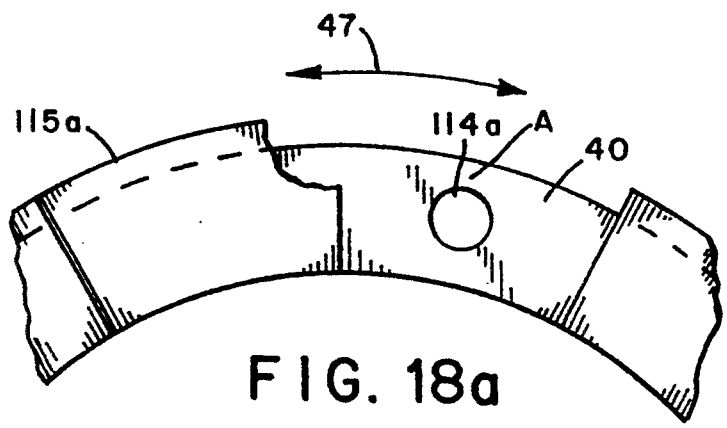
Figure 18B:
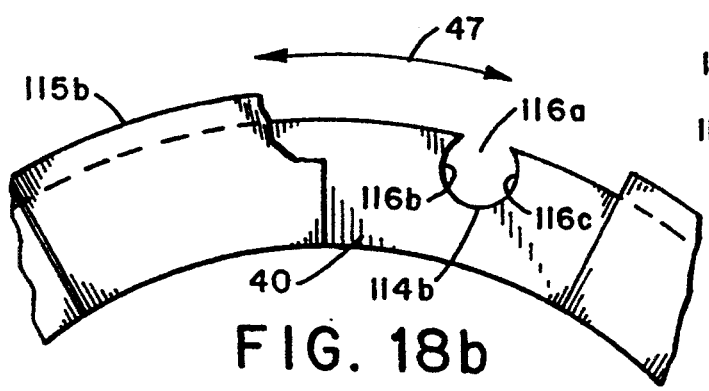
Figure 18C:
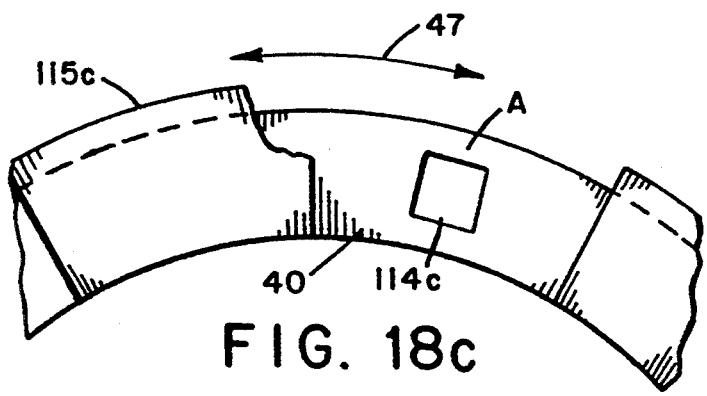
Figure 19C:
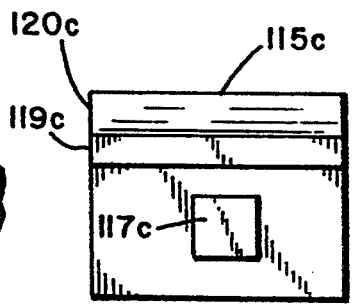
Figure 18D:
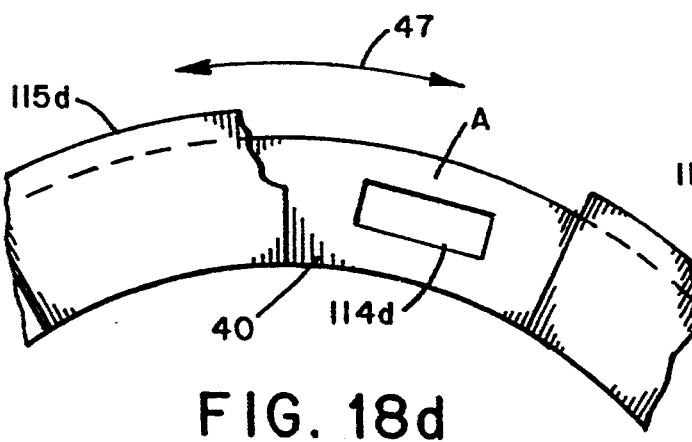
Figure 19D:
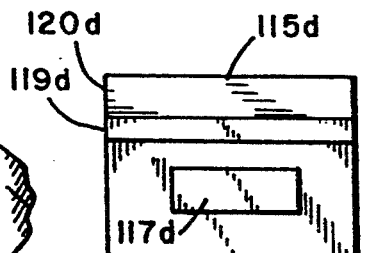

Although in a preferred embodiment, the aforementioned male and female formations are substantially dovetail shaped, other type geometric shapes may also be utilized. FIGS. 18a-e, show partial views, similar to FIG. 2, of alternate embodiments of the present invention wherein female formations 114a-e have geometric shapes other than dovetail. Female formation 114a is substantially circular shaped. Formation 114b has a substantially circular shaped perimeter, except for open portion 116a. Inner sidewalls 116b and 116c function in a manner similar to inner walls 57a and 57b, respectively, of dovetail opening 44 shown in FIG. 2. FIGS. 18c, 18d and 18e show female formations in blade 40 which have substantially square, rectangular and triangular, respectively, geometric shapes. FIGS. 19a-e show wear-resistant tiles 115a-e, respectively, having complimentary configured male formations 117a-e, respectively, that are disposed within corresponding female formations 114a-e, respectively. Each tile 115a-e has top portion 120a-e, respectively, and overhanging portion 119a-e, respectively, similar to the tiles previously discussed above. Formations 114a and 114c-e are formed in blade 40 in a manner such that a portion of blade 40, indicated by the letter A, is above the formations 114a and 114c-e in order to prevent tile movement that is radial to the conveyor rotational axis. Female and male formations having geometric shapes other than the ones described above may also be utilized.

In the embodiments described above, stainless steel strips 66, 104 and 108 are comprised of flat stainless steel wire. Each strip has a hole drilled therethrough for receiving a corresponding retaining screw. All of the above-described embodiments may be utilized with cylindrically shaped screw conveyors as well as conically shaped screw conveyors. All tiles or wear resistant members described above may be formed from powdered metal or ceramic.

It is preferred that the retaining screw, threaded bore configuration be utilized to secure the tiles to the aforementioned steel strips. However, rivets, shanks or other mechanical securing means may be utilized to removably secure the tiles to the strips. For instance, a rivet may be used to secure the tile to the strip. If it is necessary to replace the tile, the rivet may be drilled out and then removed.

In alternate embodiment, tile 42 (see FIGS. 16 and 17) is brazed to flight 40. In order to implement such a configuration, surfaces 42a-c of tile 42 are metalized with a brazing medium. Tile 42 is then brazed to flight 40 via a standard brazing process. The brazing medium depends on the process or application for which the centrifuge conveyor is to be used, e.g. recovering corn starch, concentrating protein and extracts, separating resins, clarifying and dewatering pigments, dewatering hydroxy based slurries, etc. For example, it is preferred that a bronze brazing medium be used if the centrifuge is used in a corn wet-milling process since bronze does not react with the feed material or process additives utilized in such a process. For similar reasons, a nickel brazing medium is preferred for pharmaceutical applications. Other applications may require a brazing medium comprised of other type metals, such as silver, brass or nickel copper-alloys. Brazing tile 42 to flight 40 provides a high-strength, durable bond between the tile and the conveyor flight. Furthermore, brazing the tile to the flight allows for the elimination of external fastening devices such as the aforementioned retaining screw and plate/strip configurations, or the aforementioned zirconia plug 72. Additionally, brazing the tile to the conveyor flight allows for the utilization of tiles of varying sizes and geometric shapes, and facilitates installation and replacement of tiles.

Thus, the objects of the present invention are achieved by the aforementioned embodiments which provide hard surfacing (wear-resistant or abrasion resistant surfacing) which is easily removed from or secured to conveyor flights of minimum height. The ease of replacing and installing the wear-resistant tiles of the present invention afford the end uses of centrifuges the opportunity to conduct repairs in a timely fashion without sacrificing productivity. Since the aforementioned tiles are comprised of silicon carbide, tungsten carbide, ceramic or zirconia, the tiles are light in weight and thus, do not impede the rotation of the screw conveyor nor impose any strain on the conveyor drive system. The wear-resistant tiles of the present invention are also used to modify existing centrifuge conveyors. Such modifications require forming the aforementioned female formation (cutout) into the conveyor flight at equidistant locations. Any of the aforementioned wear-resistant tile embodiments may be used in conjunction with the cutout formed in the conveyor flight. The complimentary configured male and female formations, as described above, afford manufacturers flexibility in choosing the type of material for fabricating the wear-resistant tiles.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

While the invention has been illustrated and described in what are considered to be the most practical and preferred embodiments, it will be recognized that many variations are possible and come within the scope thereof, the appended claims therefor being entitled to a full range of equivalents.

Thus, having described the invention, what is claimed is:

1. A hard surfaced screw conveyor, comprising:
   a helical metal blade mounted for rotation about a longitudinal axis of the helix and radially extending to an end surface, said blade defining at least one female formation therein having a substantially dovetail shape and a longitudinal axis substantially perpendicular to said blade; and
   at least one wear-resistant member secured to said blade and having a portion radially extending beyond said end surface, said at least one wear-resistant member defining a male formation having a substantially dovetail shape and which is disposed within said at least one female formation.

2. The hard-surfaced screw conveyor of claim 1 wherein said at least one wear-resistant member has a portion thereof substantially disposed over said end surface of said blade.

3. The hard surfaced screw conveyor of claim 2 wherein said at least one wear-resistant member is fabricated from a first material and has a bore formed therethrough, said bore having a longitudinal axis substantially parallel to the longitudinal axis of said at least one female formation, and a plug fabricated from a second material disposed within said bore, said second material having a higher degree of elasticity than said first material.

4. The hard surfaced screw conveyor of claim 3 further comprising:
a plate rigidly attached to said blade; and
means for removably fastening said plug to said plate.

5. The hard surfaced screw conveyor of claim 2 further comprising:
a plate rigidly attached to said blade; and
means for removably fastening said at least one wear-resistant member to said plate so as to retain said male formation within said at least one female formation.

6. The hard surfaced screw conveyor of claim 2 wherein said at least one wear-resistant member is fabricated from ceramic.

7. The hard surfaced screw conveyor of claim 6 wherein said at least one wear-resistant member is brazed to said blade.

8. The hard surfaced screw conveyor of claim 7 wherein a brazing medium is disposed intermediate said at least one wear-resistant member and said blade.

9. The hard surfaced screw conveyor of claim 1 wherein said at least one female formation has a bottom surface, said screw conveyor further including a recess formed in the bottom surface of said at least one female formation.

10. The hard surfaced screw conveyor of claim 9 wherein said male formation has a bottom surface, said screw conveyor further including a recess formed in the bottom surface of said male formation, said recess of said male formation being aligned with said recess of said at least one female formation so as to define a chamber.

11. The hard surfaced screw conveyor of claim 10 wherein said at least one female formation has inner walls, said conveyor further including a deformable member disposed within said chamber to create frictional contact between said male formation and the inner walls of said at least one female formation thereby preventing said at least one wear-resistant member from becoming dislodged from said blade.

12. The hard surfaced screw conveyor of claim 11 wherein said deformable member has a substantially spherical shape.

13. The hard surfaced screw conveyor of claim 11 further including an epoxy adhesive coating intermediate said male formation and the inner walls of said at least one female formation.

14. The hard surfaced screw conveyor of claim 1 further comprising:
a backing plate attached to said male formation;
a retaining plate rigidly attached to said blade; and
means for removably fastening said backing plate to said retaining plate so as to retain said male formation within said at least one female formation.

15. A hard surfaced screw conveyor, comprising:
a helical metal blade mounted for rotation about a longitudinal axis of the helix and radially extending to an end surface;
at least one wear-resistant member on said blade and having a portion radially extending beyond said end surface;
means securing said at least one wear-resistant member to said blade, said securing means comprising male and female formations on said at least one wear-resistant member and said blade, respectively, said female formation having a longitudinal axis substantially perpendicular to said blade, said male and female formations cooperating to preclude said at least one wear-resistant member from moving in a direction radial to the helix longitudinal axis or parallel to said blade;
a backing plate attached to said male formation;
a retaining plate rigidly attached to said blade; and
means for removably fastening said backing plate to said retaining plate to retain said male formation within said female formation.

16. A hard surfaced screw conveyor, comprising:
a helical metal blade mounted for rotation about a longitudinal axis of the helix and radially extending to an end surface;
at least one wear-resistant member on said blade and having a portion radially extending beyond said end surface; and
means securing said at least one wear-resistant member to said blade, said securing means comprising male and female formations on said at least one wear-resistant member and said blade, respectively, said female formation having a longitudinal axis substantially perpendicular to said blade, said male and female formations having a substantially dovetail shape, said male and female formations cooperating to preclude said at least one wear-resistant member from moving in a direction radial to said helix longitudinal axis or parallel to said blade.

17. A hard surfaced screw conveyor, comprising:
a helical metal blade mounted for rotation about a longitudinal axis of the helix and radially extending to an end surface, said blade defining at least one female formation therein having a substantially triangular shape and a longitudinal axis substantially perpendicular to said blade; and
at least one wear-resistant member secured to said blade and having a portion radially extending beyond said end surface, said at least one wear-resistant member defining a male formation having a substantially triangular shape which is disposed within said at least one female formation.

18. A hard surfaced screw conveyor, comprising:
a helical metal blade mounted for rotation about a longitudinal axis of the helix and radially extending to an end surface, said blade defining at least one female formation therein having a substantially square shape and a longitudinal axis substantially perpendicular to said blade; and
at least one wear-resistant member secured to said blade and having a portion radially extending beyond said end surface, said at least one wear-resistant member defining a male formation having a substantially square shape which is disposed within said at least one female formation.

19. A hard surfaced screw conveyor, comprising:

a helical metal blade mounted for rotation about a longitudinal axis of the helix and radially extending to an end surface, said blade defining at least one female formation therein having a substantially circular shape and a longitudinal axis substantially perpendicular to said blade;

at least one wear-resistant member secured to said blade and having a portion radially extending beyond said end surface, said at least one wear-resistant member defining a male formation having a substantially circular shape which is disposed within said at least one female formation;

a backing plate attached to said male formation;

a retaining plate rigidly attached to said blade; and means for removably fastening said backing plate to said retaining plate to retain said male formation within said at least one female formation.

20. A hard surfaced screw conveyor, comprising:

a helical metal blade mounted for rotation about a longitudinal axis of the helix and radially extending to an end surface, said blade defining at least one female formation therein having a substantially rectangular shape and a longitudinal axis substantially perpendicular to said blade; and at least one wear-resistant member secured to said blade and having a portion radially extending beyond said end surface, said at least one wear-resistant member defining a male formation having a substantially rectangular shape and which is disposed within said at least one female formation.

* * * * *